United States Patent
Gamishev et al.

(10) Patent No.: US 10,887,754 B2
(45) Date of Patent: Jan. 5, 2021

(54) METHOD OF REGISTERING A MOBILE TERMINAL IN A MOBILE COMMUNICATION NETWORK

(71) Applicant: ORANGE, Paris (FR)

(72) Inventors: Todor Gamishev, Paris (FR); Antoine Mouquet, Courbevoie (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/091,799

(22) PCT Filed: Apr. 3, 2017

(86) PCT No.: PCT/FR2017/050769
§ 371 (c)(1),
(2) Date: Oct. 5, 2018

(87) PCT Pub. No.: WO2017/174910
PCT Pub. Date: Oct. 12, 2017

(65) Prior Publication Data
US 2019/0159014 A1    May 23, 2019

(30) Foreign Application Priority Data
Apr. 5, 2016   (FR) ...................................... 16 52970

(51) Int. Cl.
*H04W 8/08*   (2009.01)
*H04W 12/06*   (2009.01)
(Continued)

(52) U.S. Cl.
CPC ............. *H04W 8/082* (2013.01); *H04L 12/66* (2013.01); *H04W 8/04* (2013.01);
(Continued)

(58) Field of Classification Search
CPC ................. H04L 12/66; H04L 12/4679; H04L 29/06333; H04W 12/00518; H04W 12/06;
(Continued)

(56) References Cited

U.S. PATENT DOCUMENTS

2015/0146519 A1* 5/2015 Zakrzewski ............ H04W 8/30
370/221

FOREIGN PATENT DOCUMENTS

WO   2010086014 A1   8/2010

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)." 3GPP TS 23.401. V13.4.0. Sep. 2015.

(Continued)

*Primary Examiner* — Kan Yuen
(74) *Attorney, Agent, or Firm* — David D. Brush; Westman, Champlin & Koehler, P.A.

(57) ABSTRACT

A method of registering a mobile terminal in a mobile communication network via a base station, an access link between the base station and the core of the network being switched from a normal mode of operation to a degraded mode of operation. The method is implemented by a local mobility management entity and includes: receiving an attachment request, retransmitted by the base station and originating from the mobile terminal, the request including an identifier of the mobile terminal, dispatching, to an agent mobility management item, a request for security information specific to the mobile terminal, the request including the identifier of the mobile terminal, receiving a response to the request for security information, the response including security information specific to the mobile terminal, the (Continued)

security information originating from a server of subscribers of the network, and authenticating the terminal by using the security information received.

9 Claims, 3 Drawing Sheets

(51) Int. Cl.
    *H04L 12/66*     (2006.01)
    *H04W 8/04*     (2009.01)
    *H04W 12/00*     (2009.01)
    *H04W 84/04*     (2009.01)

(52) U.S. Cl.
    CPC ..... *H04W 12/00518* (2019.01); *H04W 12/06* (2013.01); *H04W 84/045* (2013.01)

(58) Field of Classification Search
    CPC ....... H04W 84/045; H04W 8/02; H04W 8/04; H04W 8/06; H04W 8/082; H04W 8/18; H04W 8/20
    See application file for complete search history.

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)." 3GPP TS 23.401. V8.4.1. Dec. 2008.

"3rd Generation Partnership Project; Technical Specification Group Services and System Aspects; General Packet Radio Service (GPRS) enhancements for Evolved Universal Terrestrial Radio Access Network (E-UTRAN) access (Release 12)." 3GPP TS 23.401. V12.0.0. Mar. 2013.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13)". 2GPP TS 29.272. V13.3.0. Sep. 2015.

"3rd Generation Partnership Project; Technical Specification Group Core Network and Terminals; 3GPP Evolved Jacket System (EPS); Evolved General Packet Radio Service (GPRS) Tunnelling Protocol for Control plane (GTPv2-C); Stage 3 (Release 9)." 3GPP TS 29.274. V9.10.0. Mar. 2012.

"3rd Generation Partnership Project; Technical Specification Group Core Network and Terminals; General Packet Radio System (GPRS) Tunnelling Protocol User Plane (GTPv1-U) (Release 13)." 3GPP TS 29.281. V13.1.0. Mar. 2016.

"3rd Generation Partnership Project; Technical Specification Group Services and System Aspects; 3GPP System Architecture Evolution (SAE); Security architecture (Release 13)." 3GPP TS 33.401. V13. 0.0. Sep. 2015.

General Dynamics UK Ltd. "Proposed study of enhancements to Isolated E-UTRAN Operation for Public Safety (IOPS)." 3GPP Draft; S2-160409 IOPS SI Discussion, 3rd Generation Partnership Project (3GPP), Mobile Competence Centre; 650, Route des Lucioles; F-06921 Sophia-Antipolis Cedex; France; vol. SA WG2, No. ST Kitts. Jan. 19, 2016.

General Dynamics UK Ltd. "Add informative annex containing implementation and employment guidelines for IOPS." 3GPP Draft; 23.401-CR2903R2_IOPS_(REL-13)_S2-152937, TS23 401 CR2903— IOPS, 3rd Generation Partnership Project (3GPP), Mobile Competence Centre; 650, Route des Lucioles; F-06921 Sophia-Antipolis Cede, vol. SA WG2, No. Sophia-Antipolis, France; Aug. 31, 2015-Sep. 3, 2015. Sep. 14, 2015.

Orange. "New solution: IOPS network using the backhaul for authentication only." 3GPP Draft; S2-161819, 3rd Generation Partnership Project. Apr. 5, 2016.

Orange. "New solution: IOPS network using the backhaul for authentication only." 3GPP Draft; S2-165957, 3rd Generation Partnership Project. Oct. 24, 2016.

International Search Report dated Jun. 30, 2017, for corresponding International Application No. PCT/FR2017/050769, filed Apr. 3, 2017.

Written Opinion of the International Searching Authority dated Jun. 30, 2017, for corresponding International Application No. PCT/FR2017/050769, filed Apr. 3, 2017.

* cited by examiner

METHOD OF REGISTERING A MOBILE TERMINAL IN A MOBILE COMMUNICATION NETWORK

CROSS-REFERENCE TO RELATED APPLICATIONS

This Application is a Section 371 National Stage Application of International Application No. PCT/FR2017/050769, filed Apr. 3, 2017, the content of which is incorporated herein by reference in its entirety, and published as WO 2017/174910 on Oct. 12, 2017, not in English.

FIELD OF THE DISCLOSURE

The present invention relates to the field of access to a mobile communication network, and more particularly access to this network when the access link between the base station and the core network is degraded and/or limited with respect to bit rate.

BACKGROUND OF THE DISCLOSURE

The current mobile communication networks are based on an architecture of "EPS" (Evolved Packet System) type, as defined by the 3GPP standardization organization. In this context, a procedure for the registration, or attachment, of a mobile terminal with an access network is defined.

In a network of EPS type, the base stations, or eNodeB, are in charge of the radio interchanges with the mobile terminal. A base station is linked to the core network via a backhaul link which routes streams through an interface denoted S1. The interface S1 consists of a first interface, denoted S1-U, intended to route traffic between the base station and a service gateway denoted S-GW, and a second interface, denoted S1-MME, intended to route control messages between the base station and a mobility management entity, denoted "MME" (Mobile Management Entity), responsible for control in an "EPC" ("Evolved Packet Core") network. Without the backhaul link between the base station and the core network, a base station becomes inoperative. The same applies when the backhaul link is significantly degraded in terms of bit rate, for example because of a network incident, a natural disaster, or even a criminal act.

It is however desirable for a base station whose backhaul link is degraded and/or limited in terms of bit rate to continue to provide a local communication service between users who are under its coverage, or to a part thereof, for example civil security services, or between users of one and the same enterprise who might be locked in a building.

In a conventional mode of operation, the EPS system does not offer this possibility because the communication between two mobile terminals, whether they are served by the same base station or by different base stations, is based on streams which pass necessarily through the interface S1-U, to a service gateway S-GW or a packet gateway P-GW.

The specification TS 23.401 version 13.4.0 describes, in its annex K, the operation of the network in isolated mode. Known by the acronym "TOPS" ("Isolated E-UTRAN Operation for Public Safety"), this operation allows communication between the members of an emergency team who are within the coverage of a given base station. A local core network (or "Local EPC"), which includes a mobility management entity MME, a service gateway S-GW, a packet gateway P-GW and a subscriber server "HSS" (Home Subscriber Server) is thus co-located on a site with the base station. That offers the advantage that no data stream or signaling stream between the site of the base station and the rest of the network circulates. This solution does however require advance configuration, in the co-located subscriber server HSS, of the authentication and subscription data (referred to as "credentials") for the users under the coverage of the base station for whom communications are desired to be authorized. That limits the use of the base station to a group of users defined in advance.

Another known functionality of the network, called SIPTO@LN (Selected IP Traffic Offload at the Local Network), and described in the 3GPP TS 23.401 version v12.0.0 specification, allows the direct routing of a stream between users under the coverage of the same base station, without involving the backhaul network. This functionality was provided to partially offload internet traffic from the mobile core network by distributing an internet network gateway function to the periphery of the network. To this end, the service gateway S-GW and the packet gateway P-GW are replaced by a local gateway denoted L-GW which offers the functionalities of these two gateways and which is co-located with the base station. The traffic does not therefore necessarily have to be routed to the core network via the backhaul link. However, signaling interchanges between the base station and the mobility management entity MME are still necessary and must then use the backhaul network.

Thus, it is currently not possible, in the case of an incident affecting the backhaul link between the base station and the rest of the network, to offer an network access service to users who might arrive in a geographic zone situated under the coverage of this base station in order to allow these users to communicate with one another. A user is, here, a subscriber to the network or a subscriber of another network for which roaming agreements have been made. That would make it possible for example to provide a network connectivity to a team of relief workers from a foreign country, or to offer essential services to all the users situated under the coverage of the base station, for example access to a web page providing information on the organizations if necessary.

SUMMARY

One of the aims of the invention is to remedy the inadequacies/drawbacks of the state of the art and/or to provide improvements thereto.

To this end, the invention proposes a method for registering a mobile terminal in a mobile communication network via a base station, the base station being switched from a normal operating mode to a degraded operating mode, the method, implemented by a local mobility management entity, comprising:

a step of reception of an attachment request, originating from the mobile terminal,
  a step of sending, to a proxy mobility management entity (P-MME), of a request for security information specific to the mobile terminal, said request comprising an identifier of the mobile terminal,
  a step of reception of a response to the request for security information, said response comprising security information specific to said mobile terminal,
  a step of authentication of said terminal by means of the security information received.

The method described here makes it possible to offer a connectivity service in the mobile network following an incident by relying on a link of very low bit rate between the site of the base station and the rest of the network. The incident may occur following a natural disaster, a criminal act, etc.

Thus, it is possible to provide a mobile network access service between users of mobile terminals who are under the coverage of a partially isolated base station, or to some of said users. To this end, it is not necessary for the users likely to access the network via the base station to be known and previously registered on a dedicated subscriber server HSS. Indeed, the authentication of the user, implemented as close as possible to the terminal, that is to say on the local mobility management entity, is based on authentication data obtained from the subscriber server HSS of the core network via the link with limited bit rate. Thus, there is no constraint such as an a priori knowledge of the users likely to access the network from the base station.

Moreover, that allows the local mobility management entity L-MME to derive cryptographic keys intended to secure the interchanges between the mobile terminal UE and the local mobility management entity L-MME that makes it possible to perform the subsequent signaling interchanges locally, between the mobile terminal UE and the local mobility management entity L-MME, without going back up into the core network.

The connection of the mobile terminal to the network and the traffic data specific to the terminal do not thus go back up to the level of the backhaul network via the emergency link.

The method makes it possible for example, in the case where the limitation of the bit rate of the link between the base station and the core network is the result of an event such as a natural disaster or a criminal act, to guarantee a communication between the users who are under the coverage of the base station. These are for example members of emergency teams dispatched to the site. In particular, the method allows a foreign emergency team, whose incumbent operator has entered into roaming agreements with the operator managing the base station, to communicate with other teams also present without any particular prior procedure. The method also makes it possible to provide people who might be isolated following this event with access to information pages providing them with recommendations on how to proceed, or on the organization of the emergency response.

In an exemplary embodiment, the method comprises a step of sending of a request for subscription data to the control entity of the network, the sending of said request being representative of a successful registration of the mobile terminal with the network.

This step makes it possible to implicitly inform the proxy mobility management entity that the mobile terminal is correctly attached to the network. Indeed, the proxy mobility management entity considers that the sending of the request for subscription data by the local mobility management entity, following the registration of the mobile terminal with the network, is legitimate. At this stage, the mobile terminal is located in the network: it can be reached and can send packets. In this case, the traffic from and to the mobile terminal is routed via the local gateway L-GW, co-located with the base station.

In an exemplary embodiment, the method also comprises a step of sending, to the proxy mobility management entity, of a request for verification of the identity of the mobile terminal.

The local mobility management entity is thus able to verify whether the terminal forms part of a list of stolen terminals.

The invention relates also to a method for registering a mobile terminal in a mobile communication network via a base station, the base station being switched from a normal operating mode to a degraded operating mode, the method, implemented by a proxy mobility management entity, comprising:
- a step of reception, from a local mobility management entity, of a request for security information, said request comprising an identifier of the mobile terminal,
- a step of sending of an authentication request to a subscriber server of the network, said request comprising the identifier of the mobile terminal,
- a step of reception of an authentication response, said response comprising security information specific to the mobile terminal,
- a step of sending, to the local mobility management entity, of a response to the request for security information, said response comprising the security information received.

In an exemplary embodiment, the above method also comprises:
- a step of reception of a request for subscription data from the local mobility management entity, the reception of said request being representative of a successful registration of the mobile terminal in the network and triggering an update of location information in the subscriber server,
- a step of sending of a response to the request, said response comprising subscription data specific to the mobile terminal.

The invention relates also to a local mobility management entity of a mobile communication network, comprising:
- a module for receiving attachment requests, arranged to receive, from a mobile terminal, a network attachment request,
- a module for sending information requests, arranged to send, to a proxy mobility management entity, a request for security information specific to the mobile terminal, said request comprising an identifier of the mobile terminal,
- a module for receiving responses, arranged to receive, from the proxy mobility management entity, a response to the request for security information, said response comprising security information specific to said mobile terminal,
- an authentication module, arranged to authenticate the terminal by means of the security information received.

The invention relates also to a proxy mobility management entity of a mobile communication network, comprising:
- a module for receiving requests for security information, arranged to receive, from a local mobility management entity, a request for security information, said request comprising an identifier of the mobile terminal,
- a module for sending an authentication request, arranged to send, to a subscriber server, an authentication request, said request comprising the identifier of the mobile terminal,
- a module for receiving an authentication response, arranged to receive a response to the authentication request, said response comprising security information specific to the mobile terminal,
- a module for sending security information, arranged to send, to the local mobility management entity, a response to the request for security information, said response comprising the security information specific to the mobile terminal.

The invention relates also a system for registering a mobile terminal with a mobile communication network, comprising:
- a base station, arranged to manage radio interchanges with the mobile terminal,
- a local gateway, arranged to provide functionalities of a service gateway and of a packet gateway of the network,
- a local mobility management entity as described previously, and
- a proxy mobility management entity as described previously.

The invention relates also to a computer program on a data medium and that can be loaded into the memory of a local mobility management entity, the program comprising code portions for the execution of the steps of the method for registering a mobile terminal in a network as described previously, when the program is run on said entity.

The invention relates also to a data medium in which is stored the above program.

The invention relates also to a computer program on a data medium and that can be loaded into the memory of a proxy mobility management entity computer, the program comprising code portions for the execution of the steps of the method for registering a mobile terminal in a network as described previously, when the program is run on said entity.

The invention relates also to a data medium in which is stored the above program.

BRIEF DESCRIPTION OF THE DRAWINGS

Other features and advantages of the present invention will be better understood from the description and the attached drawings in which.

DETAILED DESCRIPTION OF ILLUSTRATIVE EMBODIMENTS

A schematic representation of a network architecture, suitable for implementing the method for registering a mobile terminal in a network, according to an exemplary embodiment, will now be described in relation to FIG. 1.

The architecture and the method are illustrated here in a network of "EPS" (for Evolved Packet System) type. The invention is not however limited to this type of network and applies equally to other types of mobile networks such as, for example, the "GPRS" (General Packet Radio Service) network.

A network node 10 ensures the usual functionalities of several entities of the network. In this example, the network node 10 comprises a base station eNB partially isolated from the network, a local gateway L-GW and a local mobility management entity L-MME. The base station eNB is arranged to manage the radio transmission and reception with a mobile terminal UE via an interface LTE-Uu as described in the 3GPP specifications. The mobile terminal UE is, for example, a smartphone, a portable telephone, a tablet, etc. The local gateway L-GW provides the usual functionalities of a service gateway S-GW (for Serving Gateway) arranged to route packets, and of a packet gateway P-GW (for Packet Data Network Gateway) arranged to provide a connectivity to external networks. The local mobility management entity L-MME ensures the usual control functions of a mobility management entity "MME". The base station eNB communicates with the local mobility management entity L-MME via an interface S1-MME, and with the local gateway L-GW via an interface S1-U. The functions of the network entities S-GW, P-GW and MME and the interfaces S1-MME and S1-U are detailed in the specification TS 23.401. The base station eNB is said to be "partially isolated" in that it has local capabilities by virtue of the presence of the local gateway L-GW and of the local mobility management entity L-MME but, for all that, no user data streams, or only streams from selected users, pass from the base station eNB to the core network.

It is assumed that a link of very low bit rate is configured between the site of the base station eNB, in this case the network node 10, and the rest of the network. More specifically, the base station eNB, which has detected a degradation or an outage of the backhaul link with the rest of the network, has switched to partially isolated, or degraded, operating mode, in accordance with the architecture described in relation to FIG. 1. For example, an outage of the link between the base station eNB and the rest of the backhaul network has occurred and an emergency link with limited bit rate has been automatically put in place by the base station eNB between the network node 10 and the rest of the network according to a known method. For example, a satellite link has been established. Note that, in the case of a satellite link, the bit rate has possibly been knowingly limited in order to control the cost of this link.

The network node 10 thus co-locates on one and the same site the base station eNB and entities capable of delivering certain functionalities usually dispensed by remote entities situated in the core network. In a first exemplary embodiment, the base station eNB embeds and implements all of these functionalities. In another exemplary embodiment, distinct entities provide the functionalities of local gateway L-GW and of local mobility management L-MME and communicate with the base station eNB by means of dedicated links. The latter example allows several base stations to share, if necessary, entities of local gateway L-GW and local mobility management entity L-MME type.

The local mobility management entity L-MME is connected via the emergency link or link with limited bit rate to a proxy mobility management entity, called proxy MME, or P-MME. This proxy entity P-MME acts as intermediate entity between the network node 10 and the rest of the network. A new interface S6a' is thus defined between the local mobility management entity L-MME and the proxy entity P-MME. This new interface S6a' is based on the interface S6a as defined in the specification TS 23.401, in as much as it is arranged to transfer authentication and subscription data (called "credentials") suitable for authenticating and authorizing the access of a user between the subscriber server "HSS" (for Home Subscriber Server) of the network and the local mobility management entity L-MME.

Figure 1:
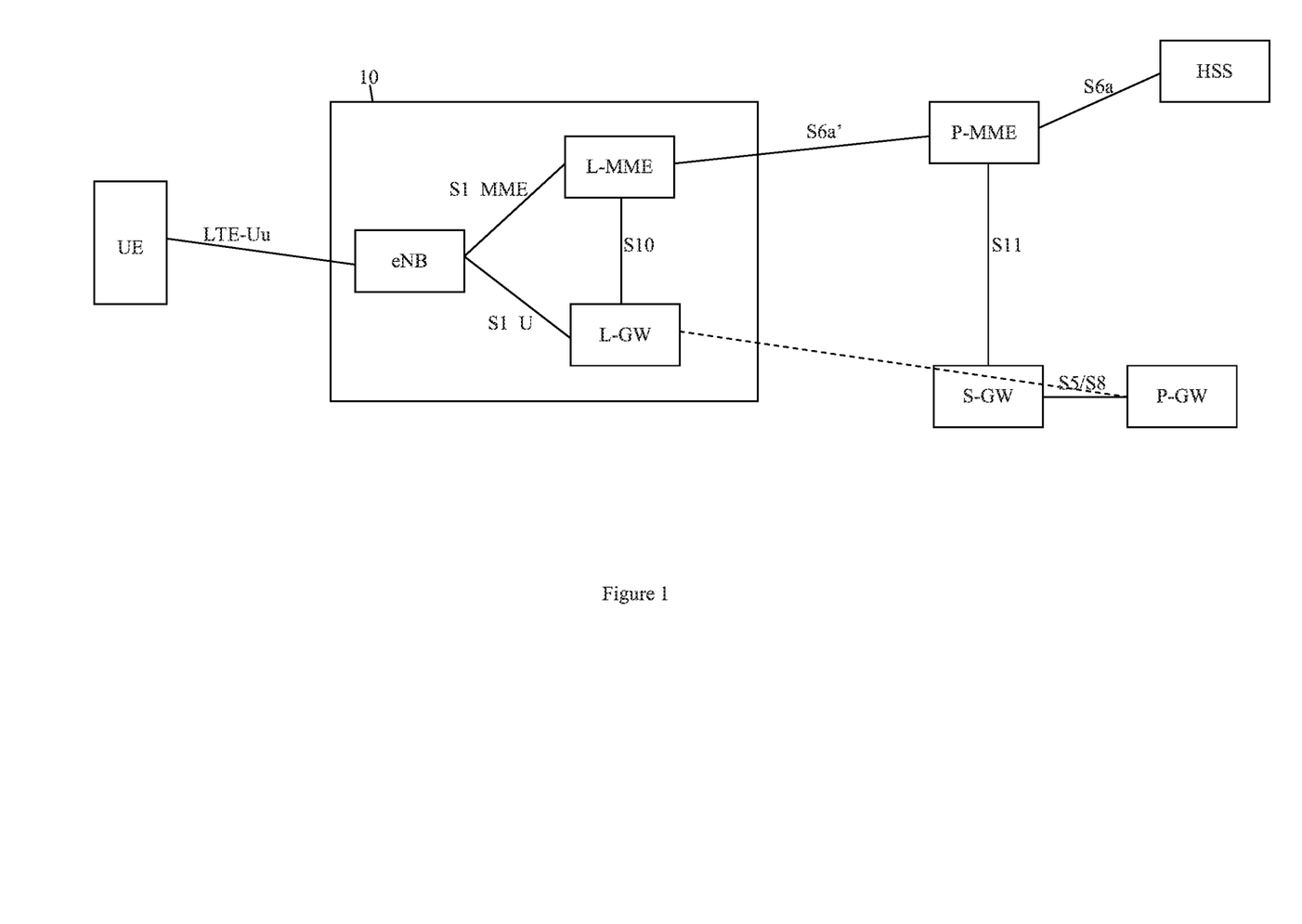
FIG. 1 is a schematic representation of a network architecture, according to an exemplary embodiment.

In an exemplary embodiment, the proxy entity P-MME can be used by a plurality of local mobility management entities (not represented in FIG. 1). For example, the proxy entity P-MME can be used by all the network nodes which are partially isolated after the occurrence of an incident. The proxy entity P-MME connects to the subscriber server HSS through an interface S6a as defined in the specification TS 23.401 and possibly to the other mobility management entities MME of the network through an interface S10 as defined in the specification TS 29.274. The proxy entity P-MME connects also, if necessary, to "SGSN" (for Serving GPRS Support Node) gateways through an interface S3 as defined in the specification TS 29.274. The proxy entity P-MME is thus seen by the rest of the network as a conventional mobility management entity MME and the users of the partially isolated base station eNB are seen by the rest of the network as being registered at the proxy entity P-MME. The SIPTO@LN functionality is thus used to locally route the data streams of the users.

The proxy entity P-MME is connected to the service gateway of the network S-GW via an interface denoted S11. The gateways S-GW and P-GW of the network communicate through an interface denoted S5/S8. The interfaces S10 and S5/S8 are defined in the specifications TS 29.274 and TS 29.281. In an exemplary embodiment, it is possible to define a particular network access point name (or "APN" for Access Point Name) for which a packet gateway of the network, here the gateway P-GW, is selected in order to allow certain users to access a complete service, that is to say one not limited to local communications. In this particular case, the data stream from and to these users passes over the link between the network node 10 and the core network. This example is illustrated in FIG. 1 by the dotted-line link.

Figure 2:
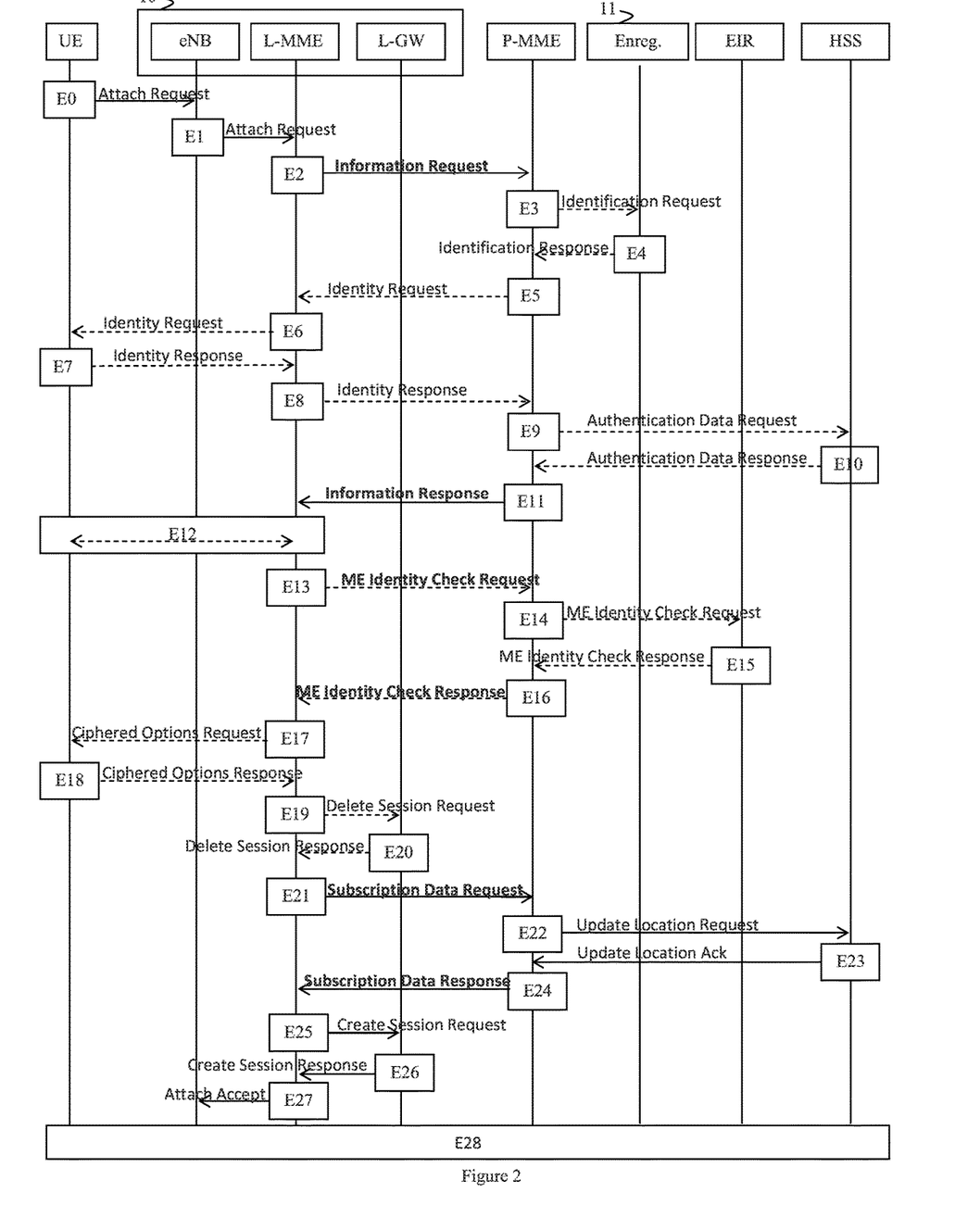
FIG. 2 presents the steps of a method for registering a mobile terminal in a mobile communication network, according to an exemplary embodiment.

The steps of a method for registering a mobile terminal in a mobile communication network, according to an exemplary embodiment, will now be described in relation to FIG. 2.

It is assumed that the base station eNB has switched from a normal operating mode to a degraded operating mode and is then partially isolated, following an event such as a natural disaster or a criminal act. There is thus a link with low bitrate between the site of the base station eNB and the rest of the network. For example, the existing link is degraded and now offers only a limited bit rate, or an emergency link, such as a satellite link, has been established by the base station eNB following a link outage and has been limited in terms of bit rate. In accordance with the architecture described in relation to FIG. 1, the functionalities of local mobility management and of service and packet gateway are co-located with the base station eNB and are provided by the local mobility management entity L-MME and the local gateway L-GW.

The proxy mobility management entity P-MME provides the partially isolated network node 10 with the network mobility control functionalities. A registration entity of the network 11, involved in the preceding registration of the mobile terminal with the network, is arranged to provide, on request, information on a context specific to the mobile terminal and created upon the preceding registration of the terminal in the network. This registration entity 11 is for example a mobility management entity MME, or another local mobility management entity, or a gateway SGSN which ensures mobility management functions in the case of a GPRS network.

In an exemplary embodiment of the invention, an identity registration network entity "EIR" (for Equipment Identity Register) is arranged to store security and identification information relating to mobile terminals. In particular, it is from the entity EIR which stores "IMEI" (International Mobile Equipment Identity) codes which uniquely identify the mobile terminals as entities that a mobile network operator can block a stolen mobile terminal.

Some interchanges described below are in accordance with those of the procedure for registering a mobile terminal in a network, as described in the specification TS 23.401, paragraph 5.3.2.1. In particular, the messages interchanged, when they have the same name, and their parameters, are identical to those of the specification. They are not therefore described in detail.

In an initial step E0, the terminal UE transmits an attachment request Attach Request, received by the base station eNB and retransmitted in a retransmission step E1 to the local mobility management entity L-MME. The attachment request comprises an identifier of the terminal UE. This identifier is either a temporary identifier of "GUTI" (for Globally Unique Temporary Identifier) type or a subscriber identifier or "IMSI" (for International Mobile Subscriber Identity) stored in the "USIM" (Universal Subscriber Identity Module) card, or the "UICC" (for Universal Integrated Circuit Card) card of the mobile terminal UE. In the example described here, it is assumed that the attachment request Attach Request comprises a temporary identifier GUTI. The temporary identifier was assigned to the mobile terminal UE in a previous request for registration of the terminal UE in the network by the network registration entity 11 which is an entity in charge of mobility management in the network.

The local mobility management entity L-MME sends, in a step E2, a request, Information Request, for security information specific to the terminal UE, to the proxy mobility management entity P-MME. This request comprises the parameters contained in the attachment request Attach Request, including the temporary identifier GUTI.

In a step E3, the proxy mobility management entity P-MME sends an identification request, Identification Request, to the registration entity 11 which allocated the temporary identifier GUTI to the mobile terminal UE in the previous registration of the terminal UE. The registration entity 11 sends an identification response, Identification Response, to the proxy mobility management entity P-MME in a response step E4. The identification response comprises a context specific to the mobile terminal UE which comprises the unique subscriber identifier IMSI with which the temporary identifier GUTI was associated, and security information.

In a case where the preceding step has failed, that is to say in the case where the mobile terminal UE was unknown to the registration entity 11, the proxy mobility management entity P-MME sends, to the local mobility management entity L-MME, in a sending step E5, an identity request, Identity Request. This request is retransmitted by the local mobility management entity L-MME to the mobile terminal UE in a step E6. This request is intended to obtain from the mobile terminal UE the unique subscriber identifier IMSI. The mobile terminal UE responds to this request in a step E7, by sending a response to the identity request, Identity Response, which comprises the IMSI. This response is transmitted by the local mobility management entity L-MME to the proxy entity P-MME in a sending step E9. Since the steps E5, E6, E7 and E8 are optional since they are executed only when the mobile terminal UE is unknown to the registration entity 11, they appear in dotted lines in FIG. 2.

At this stage, the proxy mobility management entity P-MME has the unique subscriber identifier IMSI associated with the mobile terminal UE.

In a subsequent sending step E9, the proxy entity P-MME sends a request for authentication data, Authentication Data Request, to the subscriber server HSS. The identity request comprises the identifier IMSI of the terminal UE.

The subscriber server HSS responds to the request by sending, in a response step E10, the authentication data of the terminal UE in an Authentication Data Response message. Such data comprise one or more authentication vectors.

The steps E9 and E10 may not be executed. Such is the case when the registration entity has supplied one or more authentication vectors assigned in the preceding registration, in response to the identification request sent during the step E3.

In a response step E11, the proxy security management entity P-MME responds to the request for information sent by the local mobility management entity L-MME during the step E2 in a response message, Information Response. The message comprises a context specific to the terminal UE which comprises the unique subscriber identifier IMSI and the security information received from the subscriber server HSS during the preceding step, or from the registration entity 11 during the step E4.

In an authentication step E12, the local mobility management entity L-MME authenticates the mobile terminal UE by means of the security information of the context and puts in place a security association as defined in the specification TS 33.401. The local mobility management entity L-MME can recover, after having authenticated the terminal UE and during a message interchange (not represented), the unique identifier IMEI of the mobile terminal as device.

Note that the information request, Information Request, messages and the response, Information Response, sent respectively during the steps E2 and E11 are messages which are not included in the registration procedure described in the specification TS 23.401. These two messages allow the local mobility management entity L-MME to authenticate the mobile terminal. Thus, connection data of the mobile terminal UE do not need to be routed to the proxy mobility management entity P-MME by using the low-bit rate link in order for this entity to authenticate the terminal UE, as is the case in the specification. The authentication is thus performed as close as possible to the terminal UE and locally in as much as the authentication is executed at the network node 10. Moreover, that allows the local mobility management entity L-MME to derive cryptographic keys intended to secure the interchanges between the mobile terminal UE and the local mobility management entity L-MME. That makes it possible to perform the subsequent signaling interchanges locally, between the mobile terminal UE and the local mobility management entity L-MME, without going back up into the core network.

In an exemplary embodiment, in a subsequent sending step E13 the local mobility management entity L-MME sends an identity verification request, ME Identity Check Request, to the proxy entity P-MME. This request is intended to check whether the unique identifier of the terminal IMEI is included in a database of stolen terminals. The request comprises the unique identifier IMEI of the terminal UE obtained in this example after the authentication of the terminal UE. The proxy entity P-MME transmits, in a step E14, the request to the identity registration entity EIR. In a subsequent response step E15, the identity registration entity EIR sends a response message, ME Identity Check Response, indicating whether the identifier IMEI of the terminal UE is or is not part of the stolen terminals base. The proxy mobility management entity P-MME transmits the response to the local management entity L-MME in a response step E16.

Thus, the local mobility management entity L-MME is able to check whether the terminal is one of the stolen terminals.

In a subsequent sending step E17, the local mobility management entity L-MME sends to the mobile terminal UE a request requesting encrypted options, Ciphered Options Request, in the case where the mobile terminal UE had specified, in the sending of the attachment request message during the step E0, a need to transmit options after the establishment of the encryption between the mobile terminal UE and the local mobility management entity L-MME. The terminal UE sends a response in a response step E18, Ciphered Options Response, which comprises said options, for example "PCO" (for Protocol Configuration Options) or "APN".

In a subsequent deletion step E19, executed in the case where there might still be an active logical link context (called "bearer context") specific to the mobile terminal UE on the local mobility management entity L-MME, the local management entity L-MME deletes it by sending a deletion request, Delete Session Request, to the local gateway L-GW involved. The gateway L-GW deletes the active context of the terminal UE and sends, in response, in a response step E20, a message, Delete Session Response, to the local management entity L-MME.

In a subsequent subscription data request step E21 the local mobility management entity L-MME sends request requesting subscription data, Subscription Data Request, to the proxy entity P-MME. This message is intended to indicate to the proxy entity P-MME that the registration of the terminal UE with the network has succeeded, and in particular that the authentication of the terminal with the local mobility management entity L-MME has been completed successfully.

That triggers, in a step E22, the sending by the proxy mobility management entity P-MME of a location update message, Update Location Request, to the subscriber server HSS. Note that this step is not executed if the terminal UE was previously registered with the same proxy entity P-MME.

In a subsequent response step E23, the subscriber server HSS registers the proxy mobility management entity P-MME as being the one which is associated with the mobile terminal UE and sends a response message, Update Location Ack, which contains the subscription data associated with the mobile terminal UE.

In a subsequent transmission step E24, the proxy mobility management entity P-MME sends to the local mobility management entity L-MME the subscription data of the terminal, obtained from the subscriber server HSS or already stored in the proxy entity P-MME.

In a creation step E25, the local management entity L-MME sends a message to create a logical link, Create Session Request, to the gateway L-GW co-located with the entity L-MME in order to create a logical link ("default bearer") for the mobile terminal UE.

In a creation and sending step E26, the gateway L-GW executes the operations usually executed by the service S-GW and packet P-DN gateways of the network for the creation of the logical link. The gateway L-GW sends, in a response step E26, a response message, Create Session Response, to the local mobility management entity L-MME, which comprises an IP address or an IP prefix allocated to the mobile terminal UE.

In a subsequent sending step E27, the local mobility management entity L-MME sends to the base station eNB a message, Attach Accept, representative of an actual registration of the mobile terminal UE in the network. The message comprises the temporary identifier GUTI allocated by the local mobility management entity L-MME and the IP address or the IP prefix allocated by the gateway L-GW.

The registration procedure then continues, in accordance with the steps 18 to 26 of the registration procedure described in the specification TS 23.401, the local mobility management entity L-MME then acting as mobility management entity MME and the local gateway L-GW acting as the gateways S-GW and P-GW of the network. The execution of these steps of the registration procedure is represented in the figure by the step E28.

Figure 3:
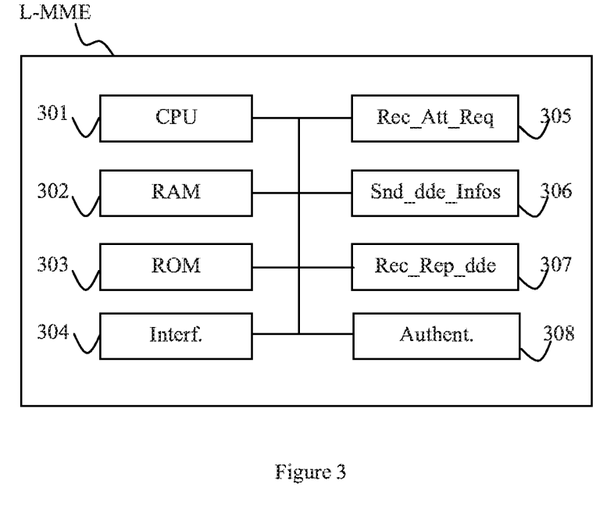
FIG. 3 is a schematic representation of a local mobility management entity, according to an exemplary embodiment.

A local mobility management entity, according to an exemplary embodiment, will now be described in relation to FIG. 3.

A local mobility management entity L-MME, in the same way as a mobility management entity MME, is a network entity in charge of control in a part of a mobile communication network. More specifically, the local mobility management entity L-MME is associated with one or more base stations which are switched to a degraded operating mode. The local mobility management entity L-MME is responsible for the registration of the mobile terminals under the network coverage of the base station eNB, for their authentication and their reachability.

The local mobility management entity L-MME is a computer server comprising:
- a processing unit or processor 301, or "CPU" (Central Processing Unit), intended to load instructions into memory, to execute them, to perform operations;
- a set of memories, including a volatile memory 302, or "RAM" (for Random Access Memory) used to execute code instructions, store variables, etc., and a storage memory 303 of "EEPROM" (for Electrically Erasable Programmable Read Only Memory) type. In particular, the storage memory 303 is arranged to store a software module comprising code instructions for implementing those of the steps of the method for registering a terminal in a network as described previously that are executed by the local mobility management entity L-MME.

The local mobility management entity L-MME also comprises:
- a set 304 of interfaces, arranged to communicate with the base station eNB, with the local gateway L-GW and with the proxy mobility management entity P-MME. More specifically, the interface with the base station eNB is in accordance with an interface S1-MME and the interface with the local gateway L-GW is in accordance with an interface S10. The interfaces S1-MME and S10 are described in the specifications TS 23.401 and TS 29.274. A new interface, denoted S6a' is defined between the local mobility management entity L-MME and the proxy mobility management entity P-MME. This new interface S6a' is based on the interface S6a as defined in the specification TS 29.272, in so far as it is arranged to transfer authentication and subscription data suitable for authenticating and authorizing access of a user between the subscriber server HSS of the network and the local mobility management entity L-MME;
- a module 305 for receiving attachment requests, arranged to receive a network attachment request, from the mobile terminal UE. The module 305 is arranged to implement the step E0 of the method for registering a mobile terminal as described previously;
- a module 306 for sending information requests, arranged to send to a proxy mobility management entity P-MME a request for security information specific to the mobile terminal, said request comprising an identifier of the mobile terminal. The module 306 is arranged to implement the step E2 of the method for registering a mobile terminal as described previously;
- a module 307 for receiving responses, arranged to receive from the proxy mobility management entity a response to the request for security information, said response comprising security information specific to said mobile terminal. The module 307 is arranged to implement the step E11 of the method for registering a mobile terminal described previously;
- an authentication module 308, arranged to authenticate the mobile terminal by means of the security information received. The authentication module 308 is arranged to implement the step E12 of the registration method as described previously.

The set of interfaces 304, the module 305 for receiving attachment requests, the module 306 for sending information requests, the module 307 for receiving responses and the authentication module 308 are preferably software modules comprising software instructions for implementing the steps of the method for registering a mobile terminal in the network which are executed by the local mobility management entity L-MME.

The invention therefore relates also:
- to a computer program comprising instructions for the implementation of the method for registering a mobile terminal as described previously when this program is run by a processor of the local mobility management entity L-MME, and
- a readable storage medium on which is stored the computer program described above.

Figure 4:
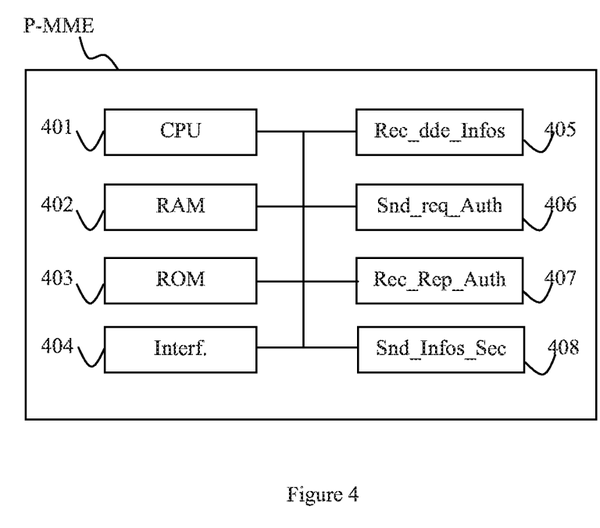
FIG. 4 is a schematic representation of a proxy mobility management entity, according to an exemplary embodiment.

A proxy mobility management entity, according to an exemplary embodiment, will now be described in relation to FIG. 4.

The proxy mobility management entity P-MME is an intermediate entity between the network node 10 which comprises the base station eNB, the local mobility management entity L-MME and the local gateway L-GW, and the core network.

The proxy mobility management entity P-MME is a computer server which comprises:
- a processor 401, intended to load instructions into memory, to execute them, to perform operations;
- a set of memories, including a volatile memory 402, used to execute code instructions, store variables, etc., and a storage memory 403 of EEPROM type. In particular, the storage memory 403 is arranged to store a software module comprising code instructions for implementing those of the steps of the method for registering a mobile terminal in a network as described previously that are executed by the proxy mobility management entity P-MME.

The proxy mobility management entity P-MME also comprises:
- a set of interfaces 404, suitable for communicating with the local mobility management entity L-MME and a subscriber server HSS of the network. More specifically, a new interface S6a' is defined between the local mobility management entity L-MME and the proxy mobility management entity P-MME. The communication interface with the subscriber server HSS is in accordance with an interface S6a as described in the specification TS 29.272.
- a module 405 for receiving requests for security information, arranged to receive, from the local mobility management entity L-MME, a request for security information, said request comprising an identifier of the mobile terminal, a module 406 for sending authentication requests, arranged to send to the subscriber server HSS an authentication request, said request comprising the identifier of the mobile terminal. The module 406 is arranged to implement the step E9 of the registration method as described previously;

a module 407 for receiving authentication responses, arranged to receive a response to the authentication request, said response comprising security information specific to the mobile terminal. The module 407 is arranged to implement the step E11 of the registration method as described previously;

a module 408 for sending security information, arranged to send to the local mobility management entity a response to the request for security information, said response comprising the security information specific to the mobile terminal. The module 408 is arranged to implement the step E11 of the registration method as described previously.

The set of interfaces 404, the module 405 for receiving requests for security information, the module 406 for sending authentication requests, the module 407 for receiving authentication responses and the module 408 for sending security information are preferably software modules comprising software instructions for implementing the steps of the method for registering a mobile terminal with the network which are executed by the proxy mobility management entity P-MME.

The invention therefore also relates:

to a computer program comprising instructions for the implementation of the method for registering a mobile terminal as described previously when this program is run by a processor of the proxy mobility management entity P-MME, and a readable storage medium on which is stored the computer program described above.

The invention relates also to a system for registering a mobile terminal UE in a mobile network, suitable for registering the mobile terminal UE in the case where the base station eNB which the mobile terminal accesses has switched from a normal operating mode to a degraded operating mode. The link established with the core network is limited in so far as it does not allow the routing of packets from and to the terminal and limits the signaling message interchanges to those relating to the authentication of the terminal. The registration system comprises:

the base station eNB, arranged to manage radio interchanges with the mobile terminal UE, a local gateway L-GW, arranged to provide the functionalities of a service gateway S-GW and of a packet gateway P-GW of the network, a local mobility management entity L-MME as described previously, and a proxy mobility management entity P-MME as described previously.

Although the present disclosure has been described with reference to one or more examples, workers skilled in the art will recognize that changes may be made in form and detail without departing from the scope of the disclosure and/or the appended claims.

The invention claimed is:

1. A method comprising:
registering a mobile terminal in a mobile communication network via a base station, an access link between the base station and the core of the network being switched from a normal operating mode to a degraded operating mode, wherein the registering being implemented by a local mobility management entity and comprising:
receiving an attachment request, retransmitted by the base station and originating from the mobile terminal, said request comprising an identifier of the mobile terminal,
sending, to a proxy mobility management entity, a request for security information specific to the mobile terminal, said request comprising the identifier of the mobile terminal,
receiving a response to the request for security information, said response comprising security information specific to said mobile terminal, said security information originating from a subscriber server of the network,
authenticating said terminal by using the security information received.

2. The method as claimed in claim 1, also comprising sending a request for subscription data to a proxy mobility management entity, the sending of said request being representative of a successful registration of the mobile terminal with the network.

3. The method as claimed in claim 2, also comprising sending, to the proxy mobility management entity, a request for verification of the identity of the mobile terminal.

4. A method comprising:
registering a mobile terminal in a mobile communication network via a base station, an access link between the base station and the core of the network being switched from a normal operating mode to a degraded operating mode, the registering being implemented by a proxy mobility management entity and comprising:
receiving, from a local mobility management entity, a request for security information, said request comprising an identifier of the mobile terminal,
sending an authentication request to a subscriber server of the network, said request comprising the identifier of the mobile terminal,
receiving from the subscriber server of an authentication response, said response comprising security information specific to the mobile terminal,
sending, to the local mobility management entity, a response to the request for security information, said response comprising the security information received.

5. The method as claimed in claim 4, comprising:
receiving a request for subscription data from the local mobility management entity, the receiving of said request being representative of a successful registration of the mobile terminal in the network and triggering an update of location information in the subscriber server,
sending a response to the request, said response comprising subscription data specific to the mobile terminal.

6. A local mobility management entity of a mobile communication network, comprising:
a processor; and
a non-transitory computer-readable medium comprising instructions stored thereon, which when executed by the processor configure the local mobility management entity to register a mobile terminal in the mobile communication network via a base station, an access link between the base station and a core of the network being switched from a normal operating mode to a degraded operating mode, the registering comprising:

receiving a network attachment request, retransmitted by the base station and originating from the mobile terminal, said attachment request comprising an identifier of the mobile terminal, sending, to a proxy mobility management entity, a request for security information specific to the mobile terminal, said request comprising the identifier of the mobile terminal, receiving, from the proxy mobility management entity a response to the request for security information, said response comprising security information specific to said mobile terminal, said security information originating from a subscriber server of the network, and authenticating the terminal by using the security information received.

7. A proxy mobility management entity of a mobile communication network, comprising:

a processor; and a non-transitory computer-readable medium comprising instructions stored thereon, which when executed by the processor configure the proxy mobility management entity to register a mobile terminal in the mobile communication network via a base station, an access link between the base station and a core of the network being switched from a normal operating mode to a degraded operating mode, the registering comprising:

receiving, from a local mobility management entity, a request for security information, said request comprising an identifier of the mobile terminal, sending, to a subscriber server, an authentication request, said request comprising the identifier of the mobile terminal, receiving a response to the authentication request, said response comprising security information specific to the mobile terminal, and sending, to the local mobility management entity, a response to the request for security information, said response comprising the security information specific to the mobile terminal.

8. A non-transitory computer-readable data medium in which is stored a computer program comprising code portions for execution of a method, when the program is run on a processor of a local mobility management entity, the method comprising:

registering a mobile terminal in a mobile communication network via a base station, an access link between the base station and the core of the network being switched from a normal operating mode to a degraded operating mode, wherein the registering comprises:

receiving an attachment request, retransmitted by the base station and originating from the mobile terminal, said request comprising an identifier of the mobile terminal, sending, to a proxy mobility management entity, a request for security information specific to the mobile terminal, said request comprising the identifier of the mobile terminal, receiving a response to the request for security information, said response comprising security information specific to said mobile terminal, said security information originating from a subscriber server of the network, authenticating said terminal by using the security information received.

9. A non-transitory computer-readable data medium in which is stored a computer program comprising code portions for execution of a method, when the program is run on a processor of a proxy mobility management entity, the method comprising:

registering a mobile terminal in a mobile communication network via a base station, an access link between the base station and the core of the network being switched from a normal operating mode to a degraded operating mode, wherein the registering comprises:

receiving, from a local mobility management entity, a request for security information, said request comprising an identifier of the mobile terminal, sending an authentication request to a subscriber server of the network, said request comprising the identifier of the mobile terminal, receiving from the subscriber server of an authentication response, said response comprising security information specific to the mobile terminal, sending, to the local mobility management entity, a response to the request for security information, said response comprising the security information received.

* * * * *